(12) United States Patent
Lev Ran et al.

(10) Patent No.: US 8,190,875 B2
(45) Date of Patent: May 29, 2012

(54) REDUCING PROCESSING LOAD IN PROXIES FOR SECURE COMMUNICATIONS

(75) Inventors: Etai Lev Ran, Sunnyvale, CA (US); Ajit Sanzgiri, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1073 days.

(21) Appl. No.: 11/728,001

(22) Filed: Mar. 22, 2007

(65) Prior Publication Data

US 2008/0235508 A1    Sep. 25, 2008

(51) Int. Cl.
  *H04L 29/06* (2006.01)
  *G06F 7/04* (2006.01)
(52) U.S. Cl. .......................................... 713/150; 726/12
(58) Field of Classification Search .................. 713/150; 726/12
  See application file for complete search history.

(56) References Cited

U.S. PATENT DOCUMENTS

| | | | | |
|---|---|---|---|---|
| 7,146,505 | B1 * | 12/2006 | Harada et al. ................. | 713/185 |
| 7,174,565 | B2 * | 2/2007 | Kadyk et al. ................... | 726/12 |
| 7,249,377 | B1 * | 7/2007 | Lita et al. ....................... | 726/12 |
| 7,672,459 | B2 * | 3/2010 | O'Hara et al. ................ | 380/278 |
| 2002/0112152 | A1 * | 8/2002 | VanHeyningen et al. ...... | 713/151 |
| 2002/0138551 | A1 * | 9/2002 | Erickson ........................ | 709/203 |
| 2003/0014628 | A1 * | 1/2003 | Freed et al. .................... | 713/155 |
| 2007/0006291 | A1 * | 1/2007 | Barari et al. ................... | 726/10 |
| 2007/0074282 | A1 * | 3/2007 | Black et al. .................... | 726/14 |
| 2007/0180510 | A1 * | 8/2007 | Long et al. ..................... | 726/10 |
| 2008/0126794 | A1 * | 5/2008 | Wang et al. ................... | 713/151 |

OTHER PUBLICATIONS

Jeff Morgan, et al., "Secure Web Access in an Environment of Mutual Distrust", 22 pages, Internet and Mobile Systems Laboratory, HP Laboratories Palo Alto, HPL-2001-60, Mar. 22, 2001.

* cited by examiner

*Primary Examiner* — Techane Gergiso
(74) *Attorney, Agent, or Firm* — Fish & Richardson P.C.

(57) ABSTRACT

In one embodiment, a method for providing secure communications using a proxy is provided. The proxy negotiates with a client and a server to determine a session key to use with communications between the client and the proxy and between the proxy and the server. Encrypted data may then be received from the client at the proxy. The proxy can decrypt the encrypted data for processing using the session key. In one embodiment, the decrypted data is not altered. The proxy then sends the encrypted data that was received from the client to the server without re-encrypting the data that was decrypted. Because the proxy did not alter the data in its processing of the decrypted data and the same session key is used between communications for the proxy and the server, the encrypted data stream that was received from the client can be forwarded to the server.

14 Claims, 5 Drawing Sheets

REDUCING PROCESSING LOAD IN PROXIES FOR SECURE COMMUNICATIONS

TECHNICAL FIELD

Particular embodiments generally relate to cryptographic security.

BACKGROUND

Applications are using transport layer security (TLS)/secure sockets layer (SSL) to encrypt communications to provide end-to-end confidentiality from external and internal (i.e., inside the corporate network) eavesdroppers. For example, HTTPS uses SSL to encrypt HTTP communications between a client web browser and a web server. This prevents unauthorized applications or devices from intercepting and reading communications.

There are situations where an intermediate proxy may be required to intercept and decrypt the communications. The proxy is inserted into the communication path and creates two separate secure (TLS/SSL) connections to handle the data transfer. For example, client-to-proxy and proxy-to-server connections are created. Data arriving on one connection (e.g., the client-to-proxy connection) is decrypted using the proxy's SSL engine, inspected, and re-encrypted for transfer on the other connection (e.g., the proxy-to-server connection). This involves the decryption and re-encryption of the data communications introducing additional delay to the communication. Furthermore, decryption and re-encryption, when done in software, are resource intensive and costly.

DESCRIPTION OF EXAMPLE EMBODIMENTS

Overview

In one embodiment, a method for providing secure communications between a client and a server using a proxy is provided. The proxy negotiates with a client and a server to determine a session key to use with communications between the client and the proxy and between the proxy and the server. Negotiation algorithms are configured such that the same session key is determined for communications between the client and the proxy and between the proxy and the server.

Encrypted data may then be received from the client at the proxy. The proxy can decrypt the encrypted data for processing using the session key. For example, the processing may include read only operations, such as logging data, checking for malicious data, etc. In one embodiment, the decrypted data is not altered. The proxy then sends the encrypted data that was received from the client to the server without re-encrypting the data that was decrypted. Because the proxy did not alter the data in its processing of the decrypted data and the same session key is used between communications for the proxy and the server, the encrypted data stream that was received from the client can be forwarded to the server. Thus, a re-encrypting step is saved by not having the proxy re-encrypt the decrypted data. This reduces both latency (if the proxy processing allows sending the data before decryption—such as for accounting and access logging) and proxy resource utilization.

Example Embodiments

Figure 1:
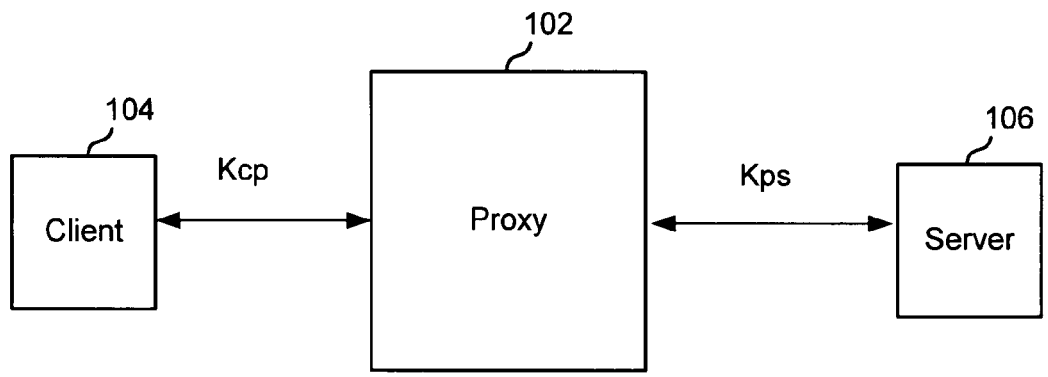
FIG. 1 shows an example of a system for reducing processing load using a proxy.

FIG. 1 shows an example of a system for reducing processing load using a proxy. As shown, the system includes a proxy 102, a client 104, and a server 106.

Particular embodiments may use security protocols in communications. Security protocols allow client/server applications to communicate in a way to prevent eavesdropping, tampering, message forgery, etc. For example, particular embodiments will be described as using TLS and/or SSL, which are cryptographic protocols that provide secure communications on networks, such as the Internet. Although TLS/SSL will be described, it will be understood that other cryptographic protocols may be used with particular embodiments.

Portions of particular embodiments may be described for providing the secure communications between client 104 and server 106 using proxies with TLS/SSL. It will be recognized that other details or steps may also be provided.

Client 104 may be any device that may be sending data to server 106. For example, client 104 may be a device that includes an application, such as a web browser, that is requesting web pages.

Server 106 may be any device communicating with client 104. For example, server 106 may be a web server that is serving web pages to client 104.

Proxy 102 may be any device that sits in between communications with client 104 and server 106. For example, proxy 102 may intercept messages sent between client 104 and server 106. Because communications are encrypted between client 104 and server 106, proxy 102 needs to be able to know how to decrypt messages received from client 104 and server 106. Proxy 102 may negotiate with client 104 to determine a session key ($K_{cp}$) that is used to encrypt communications between client 104 and proxy 102. Also, proxy 102 may communicate with server 106 to determine a second session key ($K_{ps}$).

Conventionally in TLS keys $K_{cp}$ and $K_{ps}$ are selected independently by the proxy for each communication link and are thus negotiated to be different. For example, in the upstream direction, client 104 selects the key to be used between client 104 and proxy 102. Then, in the downstream direction, proxy 102 selects the key to be used between server 106 and proxy 102. Client 104 and proxy 102 use different information to generate the session keys and thus different session keys are generated. In selecting the session key, proxy 102 may act as a client in communications with server 106 and may select a different session key. Accordingly, proxy 102 is required to decrypt the data using one session key and encrypt for relaying using a different key. This increases the resource usage, such as CPU load, of proxy 102. Also, it limits the throughput or scalability of adapters integrating network and security processing.

In contrast, particular embodiments use the same information to generate the session key in both directions thus ensuring that the session keys $K_{cp}$ and $K_{ps}$ are the same. In a particular embodiment, a pre-master key $K_p$ is used to generate a session key. For example, a function is used to determine the session key $K_s$ that is used to encrypt communications. For example, the algorithm $K_s = F(K_p)$, where F is the same function used by client 104, proxy 102, and server 106 to generate the session key. Thus, if substantially the same value of $K_p$ is used, the same session keys are determined using the function. However, if different values for $K_p$ are used, then different session keys will result.

In particular embodiments, client 102 may select a pre-master key $K_p$. Client 104 may use the pre-master key to generate the key $K_{cp}$, which is used in communications between client 104 and proxy 102. The same pre-master key may be sent to proxy 102, which can then generate the session key used in communications between client 104 and/or server 106. Proxy then sends the pre-master key to server 106, which can generate the key $K_{ps}$ using the same function. As will be discussed below, other information may be used to generate the session key, such as random values from server 106 and client 104, but for discussion purposes, these values will be discussed later.

After generation of the keys $K_{cp}$ and $K_{ps}$, client 104 and server 106 can communicate using encryption. Although the process discusses the flow of data in one direction, it will be understood that the process may be applied for communications in the other direction. Proxy 102 then receives encrypted communications from client 104 that are encrypted using key $K_{cp}$. Proxy 102 may decrypt the data and perform processing on the data. Particular embodiments may process data in a Read Only mode. That is, proxy 102 reads the information but does not alter it. Examples of different applications include access logging, Web content filtering (e.g., uniform resource locator (URL) filtering for use of appropriate content only, antivirus and spyware detection, etc.). When offending data is detected, the connection may be terminated (e.g., TCP RST) or an alternate warning page may be displayed and the connection terminated.

Thus, the processing does not alter the data that is received from client 104. Accordingly, proxy 102 can send the encrypted data received from client 104 unmodified to server 106. Thus, proxy 102 does not re-encrypt the data that it decrypted using the key $K_{cp}$. This is because the keys $K_{cp}$ and $K_{ps}$ are the same and thus the key used by client 104 to encrypt the data is the same as the key that server 106 will use the decrypt the data. Accordingly, the extra step of encrypting the decrypted data with the key $K_{ps}$ is not performed. This saves processing at proxy 102 because re-encryption step is not needed. For example, if $K_{cp}$ and $K_{ps}$ were different, then proxy 102 would always have to decrypt the data received from client 104 using the key $K_{cp}$ and then re-encrypt it using the key $K_{ps}$. Because proxy 102 does not alter the data, the encrypted data received from client 104 may be forwarded to server 106.

Figure 2:
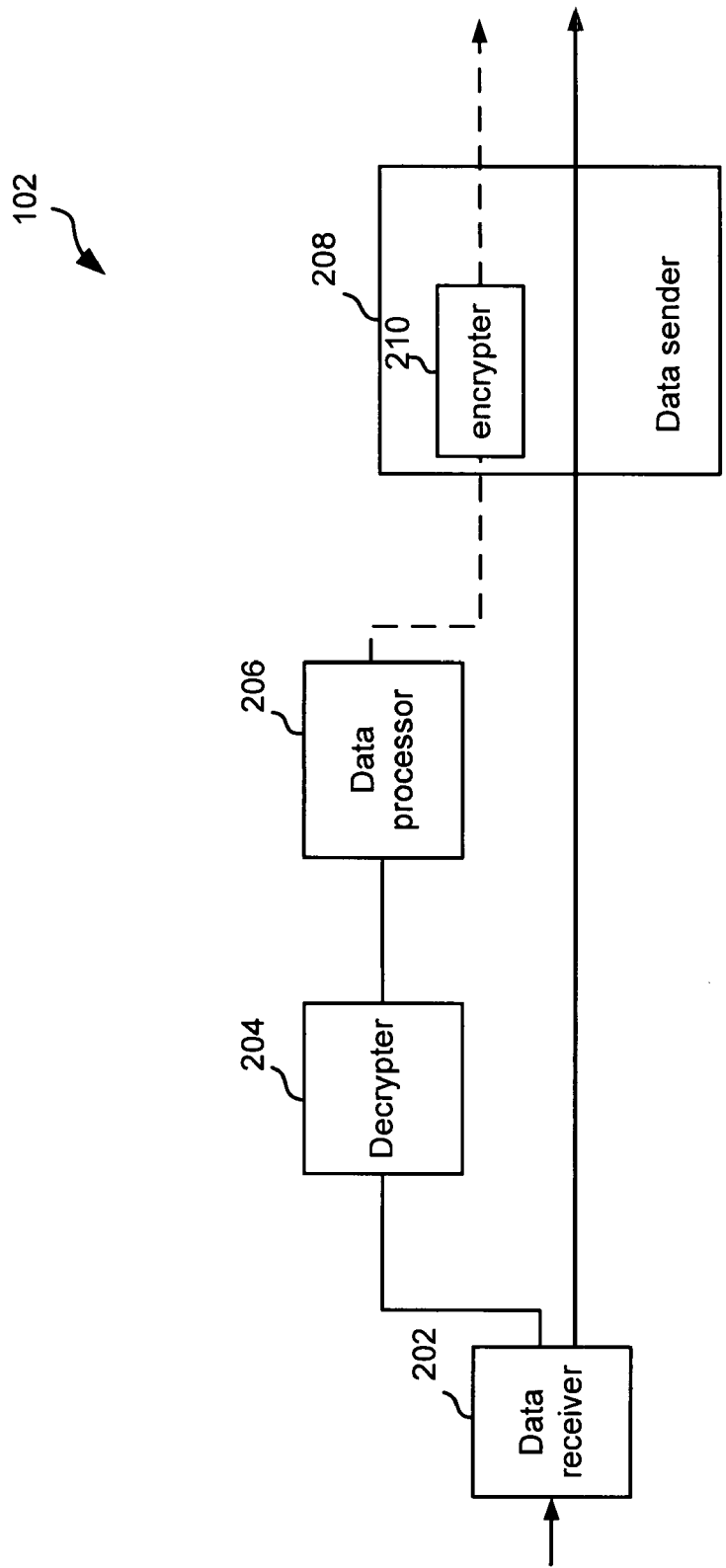
FIG. 2 shows a more detailed embodiment of the proxy.

FIG. 2 shows a more detailed embodiment of proxy 102. As shown, a data receiver 202, a decrypter 204, a data processor 206, and a data sender 208 are provided.

Data receiver 202 receives encrypted data from client 104 or server 106. The encrypted data is sent to decrypter 204.

Decrypter 204 is configured to decrypt the data using the session key. The decrypted data is then sent to data processor 206, which can process the decrypted data. As discussed above, the data may not be altered.

However, there may be situations where the decrypted data is altered. For example, in some cases, the decrypted data may need to be altered to provide local processing of the client request. In this case, the decrypted data may be sent to data sender 208. Thus, proxy 102 may also be used to generate new traffic as well as just relaying traffic from client 104 and/or server 106. In one embodiment, encrypter 210 uses the same session key to encrypt that was used to decrypt the data. In another embodiment, keys may be generated for both the read-only and read/write behavior in the data flow. For example, to support locally-generated data, a second set of keys for proxy-originated traffic are negotiated. Thus, the session keys $K_{r(cp)}$ and $K_{r(ps)}$ are the keys generated as described above and are the same. $K_r$ stands for a key that is used in a Read operation. For Read/Write operations, a second set of keys $K_{w(cp)}$ and $K_{w(ps)}$ are negotiated for proxy-generated traffic. The key $K_w$ may be randomly selected as normally in TLS/SSL processing. Encrypter 210 thus may use the read/write session keys to encrypt the data and data sender 208 is then configured send the encrypted data to server 106.

The security protocol may force renegotiation of symmetric keys by either client 104 or server 106. This is normally used to increase security. For example, if keys are periodically changed, an attacker has less data encrypted with each key.

When the session starts, the keys are negotiated to $K_r$ and proxy 102 is initially in data relay mode (i.e., passthrough). Whenever proxy 102 needs to generate traffic, it can renegotiate the SSL session key to determine $K_w$. Similarly, $K_r$ can be renegotiated with client 104 when in traffic relay mode. Thus, renegotiation may be edge-triggered when switching modes. In either case, data is always decrypted and encrypted only once and no CPU cycles are spent to do both on a given data item.

In cases where the data does not need to be re-encrypted, the encrypted data may be passed from data receiver 202 to data sender 208. Data sender 208 then sends the encrypted data to server 106. This is done without a re-encryption step. Thus, after data processor 206 processes the data, data sender 208 sends the encrypted data received from client 104. The encrypted data can also be sent before the data is processed or while it is being processed. Accordingly, the re-encryption step is not necessary.

Also, if proxy 102 is not interested in the data, proxy 102 may selectively stop decryption at any point. This further reduces the processing overhead. For example, if proxy 102 is an HTTPS proxy decrypting a server response for data scanning, if the response HTTP headers indicate that the message cannot contain malicious data (e.g., images or a response carrying no body), no further decryption may be required. Accordingly, the data may be copied from/to the sockets (client 104 and server 106) unaltered. Also, the same mechanism may be used to shed load by acting as a TCP proxy copying bytes. However, in contrast, if proxy 104 was using different keys, it would be required to continue the decryption just so it may be able to re-encrypt it with the other key.

Figure 3:
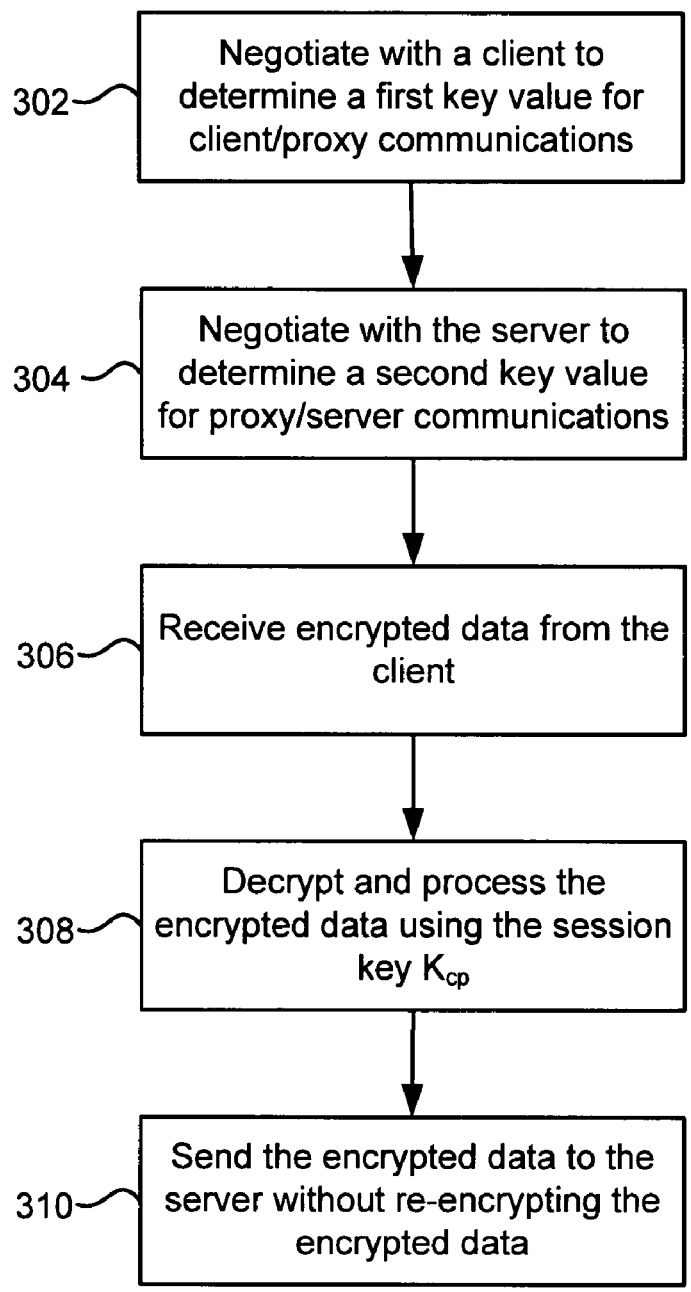
FIG. 3 depicts an example for reducing processing load at the proxy.

FIG. 3 depicts an example for reducing processing load at a proxy 102. In step 302, proxy 102 negotiates with client 104 to determine a first key value for client/proxy communications. For example, client 104 may derive the session key $K_{cp}$ using a pre-master key value that client 104 selected.

In step 304, proxy 102 negotiates with server 106 to determine a second key value for proxy/server communications. For example, proxy 102 may receive the pre-master key from client 104 and use the same function to generate the session key. Proxy 102 may then send the same key generated by client 104 to server 106, which can use the same function and pre-master key value to generate the session key. Thus, the session keys $K_{cp}$ and $K_{ps}$ have the same value.

In step 306, proxy 102 receives encrypted data from client 104. In step 308, proxy 102 decrypts the encrypted data using the session key $K_{cp}$. Proxy 102 may then process the data, if required. However, if processing is not necessary, then the decrypting step in step 208 and the processing may not be performed.

In step 310, proxy 102 sends the encrypted data to server 106 without re-encrypting the encrypted data. Accordingly, the re-encryption processing step is avoided.

Figure 4:
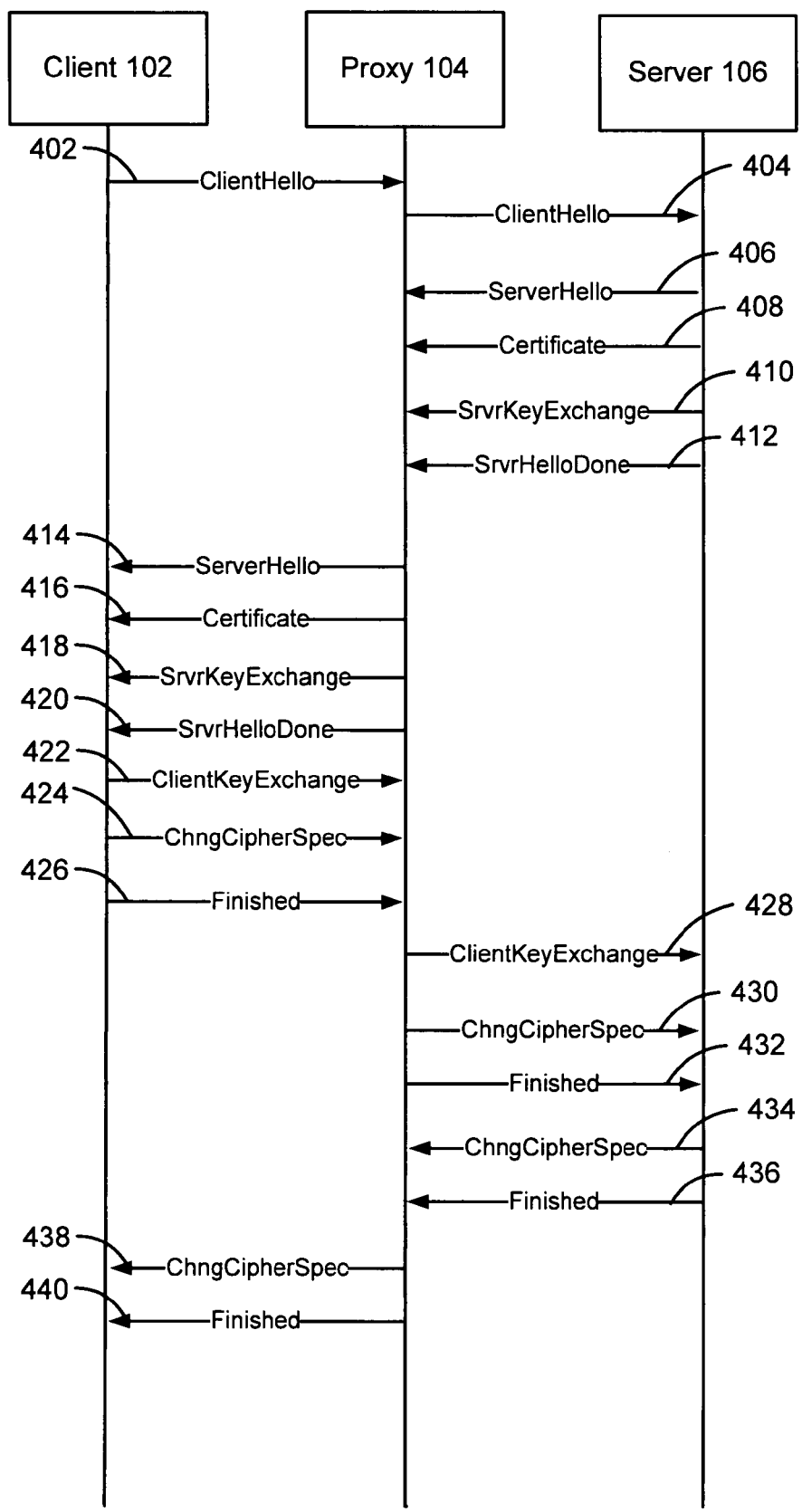
FIG. 4 depicts an example of a negotiation to determine the session keys.

FIG. 4 depicts an example of a negotiation to determine the session keys. Although this negotiation is described, it will be understood that other negotiations will be appreciated. At 402, client 104 performs a hand shake initiation using a ClientHello message. For example, the handshake may specify that TLS/SSL is required in communications, enumerate cipher suites, compression methods, and the highest protocol version that it supports. Also, this message may include the client random value that can be used in generating a session key.

At 404, proxy 102 sends a ClientHello to server 106. This ClientHello is the same ClientHello as received from client 104 and includes the client random value. At 406, server 106 sends a ServerHello message to proxy 102. The ServerHello chooses the connection parameters from the choices offered by client 104. Also, this message includes a server random value that can be used in generating the session key. For example, the session key may be generated using a function F(pre-master key, client random value, server random value).

At 408, server 106 sends a certificate to proxy 102. The certificate indicates its identity and also includes a public key. Thus, client 104 can authenticate the server identity by verifying the certificate validity as indicated by the certificate authority signature. Also, client 104 may optionally authenticate itself to server 106.

At 410, server 106 sends a SrvrKeyExchange message. At 412, a ServerHello done message is sent to proxy 102. This indicates that the parameter exchange is finished.

Also, at 416, 418, and 420, proxy 102 sends the certificate, a SrvrKeyExchange message and a ServerHelloDone message to client 104. Proxy 102 delays its initial response to the ClientHello from client 104 until proxy 102 receives the ServerHello message from server 106. When the ServerHello message is received, proxy 102 knows the server random value. Accordingly, proxy 102 can respond back to client 104 with its own ServerHello message at 414. The ServerHello message contains the same random value that it received from server 106. Client 104 can also select the pre-master key and also has selected the client random value. Client 104 now has the server random value, pre-master key, and client random value and can thus generate key $K_{cp}$ using the function. Conventionally, proxy 102 may not have waited for a response from server 106 to receive its server random value and send that to client 104. Rather, proxy 102 may have responded back right away with a random value. This is because proxy 102 expected the keys to be different and the same random value is not desired.

At 422, client 104 sends a ClientKeyExchange message to proxy 102. This includes the client pre-master key that is selected by client 104.

At 424, client 104 sends a ChngCipherSpec message to proxy 102. This message selects a cipher that is used in the encryption process. At 426, client 104 sends a Finished message to proxy 102.

Proxy 102 may delay sending a ClientKeyExchange message to server 106 until it receives one from client 104. This is because proxy 102 waits to receive the pre-master key and client random value that is chosen by client 104. By sending the same pre-master key and client random value selected by client 104, this ensures that both sessions end up using the same session key for encrypting data from server 106 as well as for decrypting data received from client 104. For example, server 106 can generate the key $K_{ps}$ using the client random value, pre-master key, and server random value using the same function that proxy 102 and client 104 used.

At 430 and 432, proxy 102 sends a ChngCipherSpec message and a Finished message to server 106. At 434 and 436, server 106 sends a ChngCipherSpec message and Finished message to proxy 102. At 438 and 440, proxy 102 forwards the ChngCipherSpec and Finished messages to client 104.

Figure 5:
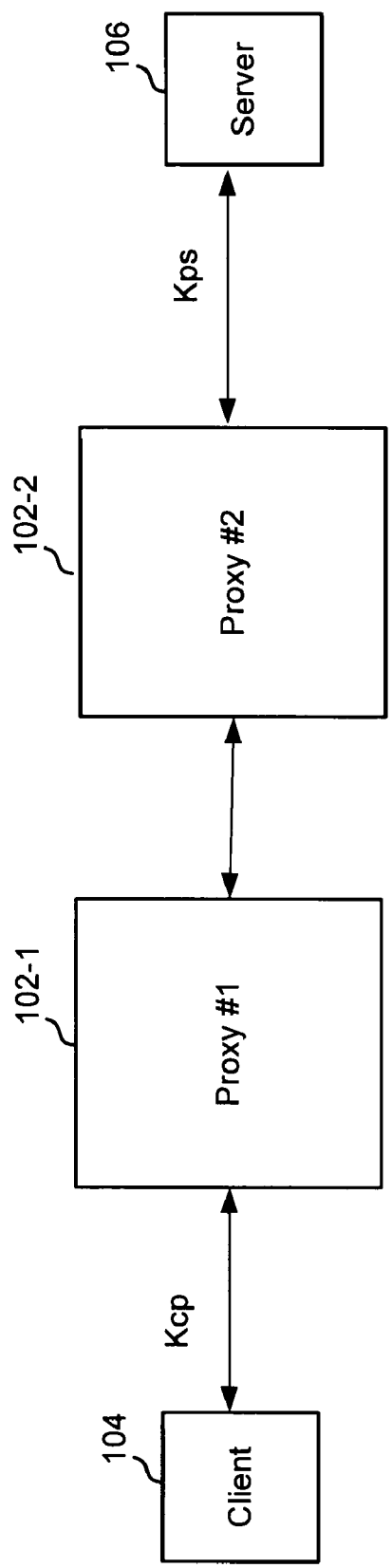
FIG. 5 shows an example of a system including two proxies.

FIG. 5 shows an example of a system including two proxies. Although two proxies are shown, it will be understood that any number of proxies may be provided. As shown, client 104 may communicate with a proxy 102-1 and server 106 communicates with a proxy 102-2. The authentication messages are relayed between proxies 102-1 and 102-2 such that session keys $K_{cp}$ and $K_{ps}$ have the same value. Thus, when client 104 sends encrypted data, it is received at proxy 102-1. Proxy 102-1 may decrypt the data using session key $K_{cp}$. Also, the encrypted data received from client 104 may be forwarded to proxy 102-2 without re-encrypting the data as discussed above.

Proxy 102-2 may forward the encrypted data stream to server 106 because the session key $K_{ps}$ is the same as $K_{cp}$. Proxy 102-2 may also decrypt the encrypted data and process it but can forward the encrypted data without a re-encryption step.

During the handshake stage, proxy 102 may be required to perform encryption and decryption separately and independently for asymmetric cryptographic operations. This is because proxy 102 may not know the private key of server 106. However, extra encryption operations may be avoided during the application data exchange. Proxy 102 may also have the private keys for server 106 and client 104. In this case, proxy 102 may be able to encrypt or decrypt the messages during the initial handshake. Proxy 102 may know the server and client's private keys because it may be in a trusted relationship with them. For example, proxy 102 may be in the same enterprise as client 104 and/or server 106.

Although the description has been described with respect to particular embodiments thereof, these particular embodiments are merely illustrative, and not restrictive. Although TSL/SSL is described, it will be understood that other security protocols may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, or a suitable combination of both software and hardware. Unless otherwise stated, functions may also be performed manually in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

"computer-readable medium" for purposes of particular embodiments may be any medium that can contain and store the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in hardware, or a suitable combination of both hardware and software. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:

receiving, in a proxy device, a pre-master key from a first device;

receiving, by the proxy device, a first message with a second device random value from a second device;

sending, by the proxy device, the second device random value to the first device, wherein the first device is configured to generate, using the second device random value along with the pre-master key, a function and a first device random value, a first session key for securing communications between the first device and the proxy device;

receiving, by the proxy device, a second message from the first device including the pre-master key and the first device random value;

determining, in the proxy device, the first session key, wherein the first session key is generated by the proxy device using the pre-master key and the first device random value received from the first device, the second device random value received from the second device and the function that is used by the first device;

sending, by the proxy device, the pre-master key and the first device random value to the second device, wherein the second device is configured to generate a second session key using the second device random value along with the pre-master key, the first device random value and the function that is used by the first device and the proxy device, such that the second session key is same as the first session key, and wherein the second session key is configured for securing communications between the second device and the proxy device;

receiving, by the proxy device, encrypted data from the first device directed toward the second device, wherein the encrypted data is encrypted using the first session key;

forwarding, by the proxy device, the encrypted data to the second device without performing any modification to the encrypted data based on decrypting using the first session key and re-encrypting using the second session key such that the encrypted data is decrypted by the second device using the second session key.

2. The method of claim 1, further comprising:

decrypting the encrypted data for processing in the proxy device by using the first session key; and performing an action with the decrypted data.

3. The method of claim 2, wherein the action does not alter data that is received as encrypted data.

4. The method of claim 1, further comprising:

generating new data at the proxy device;

encrypting, by the proxy device, the new data by using a new session key; and sending, by the proxy device, the encrypted new data to at least one of the second device and the first device.

5. The method of claim 4, further comprising:

generating, by the proxy device, a first new session key based on negotiation with the first device, wherein the first new session key is used to secure new data for communications between the first device and the proxy device, and wherein the new data is generated by the proxy device; and generating, by the proxy device, a second new session key based on negotiation with the second device, wherein the second new session key is used to secure the new data for communications between the second device and the proxy device, and wherein the second new session key is same as the first new session key.

6. The method of claim 1, wherein forwarding the encrypted data to the second device without performing any modification to the encrypted data comprises:

sending the encrypted data from the proxy device to a second proxy device, wherein the second proxy device is configured to send the encrypted data to the second device.

7. A proxy device comprising:

one or more processing devices; and logic encoded in one or more tangible media for execution by the one or more processing devices, and when executed cause the one or more processing devices to perform operations comprising:

receiving, in a proxy device, a pre-master key from a first device;

receiving, by the proxy device, a first message with a second device random value from a second device;

sending, by the proxy device, the second device random value to the first device, wherein the first device is configured to generate, using the second device random value along with the pre-master key, a function and a first device random value, a first session key for securing communications between the first device and the proxy device;

receiving, by the proxy device, a second message from the first device including the pre-master key and the first device random value;

determining, in the proxy device, the first session key, wherein the first session key is generated by the proxy device using the pre-master key and the first device random value received from the first device, the second device random value received from the second device and the function that is used by the first device;

sending, by the proxy device, the pre-master key and the first device random value to the second device, wherein the second device is configured to generate a second session key using the second device random value along with the pre-master key, the first device random value and the function that is used by the first device and the proxy device, such that the second session key is same as the first session key, and wherein the second session key is configured for securing communications between the second device and the proxy device;

receiving, by the proxy device, encrypted data from the first device directed toward the second device, wherein the encrypted data is encrypted using the first session key;

forwarding, by the proxy device, the encrypted data to the second device without performing any modification to the encrypted data based on decrypting using the first session key and re-encrypting using the second session key such that the encrypted data is decrypted by the second device using the second session key.

8. The proxy device of claim 6, wherein the logic when executed is further operable to cause the one or more processors to perform operations comprising:

decrypting the encrypted data for processing in the proxy device, wherein the encrypted data is decrypted by using the first session key; and performing an action with the decrypted data.

9. The proxy device of claim 8, wherein the action performed does not alter the data that is received as encrypted data.

10. The proxy device of claim 6, wherein the logic when executed is further operable to cause the one or more processors to perform operations comprising:

generating new data at the proxy device;

encrypting, by the proxy device, the new data by using a new session key; and sending, by the proxy device, the encrypted new data to at least one of the second device and the first device.

11. The proxy device of claim 10, wherein the logic when executed is further operable to cause the one or more processors to perform operations comprising:

generating, by the proxy device, a first new session key based on negotiation with the first device, wherein the first new session key is used to secure new data for communications between the first device and the proxy device, and wherein the new data is generated by the proxy device; and generating, by the proxy device, a second new session key based on negotiation with the second device, wherein the second new session key is used to secure the new data for communications between the second device and the proxy device, and wherein the second new session key is same as the first new session key.

12. The proxy device of claim 6, wherein forwarding the encrypted data to the second device without performing any modification to the encrypted data comprises:

sending the encrypted data from the apparatus to a second apparatus, wherein the second apparatus is configured to send the encrypted data to the second device, and wherein the first and second apparatuses are each configured to operate as a proxy device for communications between the first and second devices.

13. A non-transitory computer-readable storage medium having a plurality of instructions thereon for execution by a processor, and when executed cause the processor to perform operations comprising:
   receiving, in a proxy device, a pre-master key from a first device;
   receiving, by the proxy device, a first message with a second device random value from a second device;
   sending, by the proxy device, the second device random value to the first device, wherein the first device is configured to generate, using the second device random value along with the pre-master key, a function and a first device random value, a first session key for securing communications between the first device and the proxy device;
   receiving, by the proxy device, a second message from the first device including the pre-master key and the first device random value;
   determining, in the proxy device, the first session key, wherein the first session key is generated by the proxy device using the pre-master key and the first device random value received from the first device, the second device random value received from the second device and the function that is used by the first device;
   sending, by the proxy device, the pre-master key and the first device random value to the second device, wherein the second device is configured to generate a second session key using the second device random value along with the pre-master key, the first device random value and the function that is used by the first device and the proxy device, such that the second session key is same as the first session key, and wherein the second session key is configured for securing communications between the second device and the proxy device;
   receiving, by the proxy device, encrypted data from the first device directed toward the second device, wherein the encrypted data is encrypted using the first session key;
   forwarding, by the proxy device, the encrypted data to the second device without performing any modification to the encrypted data based on decrypting using the first session key and re-encrypting using the second session key such that the encrypted data is decrypted by the second device using the second session key.

14. The computer-readable storage medium of claim 13, wherein the instructions when executed by the processor are further operable to perform:
   decrypting the encrypted data for processing in the proxy device by using the first session key; and
   performing an action with the decrypted data in the proxy device, wherein the action does not modify the decrypted data.

* * * * *